United States Patent [19]

Liu

[11] Patent Number: 6,035,627
[45] Date of Patent: Mar. 14, 2000

[54] TURBINE ENGINE WITH COOLED P3 AIR TO IMPELLER REAR CAVITY

[75] Inventor: Xiaoliu Liu, Mississauga, Canada

[73] Assignee: Pratt & Whitney Canada Inc., Longueuil, Canada

[21] Appl. No.: 09/063,043

[22] Filed: Apr. 21, 1998

[51] Int. Cl.[7] .................................................. F02C 7/18
[52] U.S. Cl. ........................ 60/39.07; 60/39.75; 415/176
[58] Field of Search ............................... 60/39.07, 39.75; 415/104, 106, 107, 176

[56] References Cited

U.S. PATENT DOCUMENTS

| | | |
|---|---|---|
| 2,584,899 | 2/1952 | McLeod . |
| 3,742,706 | 7/1973 | Klompas . |
| 3,826,084 | 7/1974 | Branstrom et al. . |
| 3,990,812 | 11/1976 | Radtke . |
| 4,170,435 | 10/1979 | Swearingen . |
| 4,236,869 | 12/1980 | Laurello . |
| 4,296,599 | 10/1981 | Adamson . |
| 4,348,157 | 9/1982 | Campbell et al. . |
| 4,425,079 | 1/1984 | Speak et al. . |
| 4,428,713 | 1/1984 | Coplin et al. . |
| 4,459,802 | 7/1984 | Mowill ................................... 60/39.07 |
| 4,462,204 | 7/1984 | Hull . |
| 4,472,107 | 9/1984 | Chang et al. . |
| 4,502,835 | 3/1985 | Yamagata . |
| 4,657,482 | 4/1987 | Neal . |
| 4,697,981 | 10/1987 | Brown et al. . |
| 4,701,105 | 10/1987 | Cantor et al. . |
| 4,709,546 | 12/1987 | Weiler . |
| 4,761,947 | 8/1988 | Hennecke et al. . |
| 4,815,272 | 3/1989 | Laurello . |
| 4,820,116 | 4/1989 | Hovan et al. . |
| 4,825,643 | 5/1989 | Hennecke et al. . |
| 4,907,943 | 3/1990 | Kelch . |
| 5,143,512 | 9/1992 | Corsmeier et al. . |
| 5,163,285 | 11/1992 | Mazeaud et al. ....................... 60/39.07 |
| 5,174,105 | 12/1992 | Hines . |
| 5,187,931 | 2/1993 | Taylor . |
| 5,209,652 | 5/1993 | Fischer et al. . |
| 5,275,534 | 1/1994 | Cameron et al. . |
| 5,311,734 | 5/1994 | Pope et al. . |
| 5,402,636 | 4/1995 | Mize et al. . |
| 5,440,874 | 8/1995 | Charier et al. . |
| 5,555,721 | 9/1996 | Buurneuf et al. . |
| 5,567,129 | 10/1996 | Bonardi . |
| 5,581,996 | 12/1996 | Koch et al. ............................ 60/39.07 |
| 5,586,860 | 12/1996 | Bertrand et al. . |
| 5,862,666 | 1/1999 | Liu . |

FOREIGN PATENT DOCUMENTS 252045   1/1988   European Pat. Off. .

Primary Examiner—Louis J. Casaregola
Attorney, Agent, or Firm—Jeffrey W. Astle

[57] ABSTRACT

An air distribution system for an impeller rear cavity, including an air bleed at the compressor impeller tip for bleeding pressurized air into the rear cavity, and a second stream of P3 air is passed into the rear cavity area after having been cooled by a heat exchanger. The mixing of the cooled P3 air with the bleed air from the impeller tip reduces the temperature of the pressurized air in the rear cavity to reduce degradation of the impeller as well as to provide a flow of cooling air for the central bearing.

2 Claims, 2 Drawing Sheets

TURBINE ENGINE WITH COOLED P3 AIR TO IMPELLER REAR CAVITY

BACKGROUND OF THE INVENTION

1. Field of the Invention

The present invention relates to turbine engines, and more particularly, to turbine engines having improved cooled and pressurized air distribution downstream of the impeller.

2. Description of the Prior Art

It is known to bleed off high pressure air, known as P3 air, from the diffuser of the compressor into the impeller rear cavity, downstream of the centrifugal impeller for the purpose of loading the impeller and thus removing stress on the adjacent bearings. However, such pressurized air is generally at high temperature and tends to degrade the impeller hub, thereby reducing the effective life of the impeller. It is also noted that the impeller bearings must be sealed from this high temperature air, thus adding weight to the engine.

In order to reduce the degradation effect on the impeller, it has been contemplated to use high heat resistant materials. However, this will only increase the cost of the impeller while providing a weaker impeller hub more susceptible to fractionating under high centrifugal forces.

The central bearing, located downstream of the impeller, adjacent the impeller rear cavity, is sometimes cooled by compressor bleed air which has been cooled through an external heat exchanger using bypass air as a coolant. This air, known as P2X air, is at a lower pressure, thus requiring additional seals to isolate the P2X air and the central bearing from the P3 air in the impeller rear cavity that surrounds the central bearing. The P3 air is at a relatively high temperature T3.

SUMMARY OF THE INVENTION

It is an aim of the present invention to provide an engine construction that will allow high pressure P3 air to enter the impeller rear cavity at a lower temperature than T3 to thereby extend the life of the impeller hub made of conventional materials.

It is a further aim of the present invention to provide a cooler P3 air for cooling the central bearing, thereby eliminating bearing seals and thus reducing the weight and cost of the bearing assembly.

It is a further aim of the present invention to replace the cooled P2X cooled air by P25 air which has not been externally cooled, but is used to cool the front and rear bearings of the engine and the low pressure turbine.

A construction in accordance with the present invention comprises a turbine engine including a casing; a compressor section within the casing having a centrifugal impeller and a diffuser surrounding the impeller tip, whereby P3 pressurized air exits from the impeller and through the diffuser; a turbine section, a shaft mounted for rotation about a central, longitudinal axis connecting the impeller to the turbine section; a central bearing mounted to the casing downstream of the impeller and supporting the shaft; the impeller defining a rear cavity between the impeller and the turbine section, and a cavity wall surrounding the rear cavity and the central thrust bearing; means diverting a first stream of air from the impeller tip into the rear cavity; means for diverting a second stream of P3 air through a heat exchanger for cooling the second stream of P3 air; and means for passing the cooled P3 air from the heat exchanger to the rear cavity to mix with the first stream of air, whereby the temperature of the resulting mixed P3 air in the rear cavity is reduced at least to the point of improving the hub life of the impeller and eliminating the requirement of bearing seals for the central bearing.

The temperature of P3 air in the rear cavity of the impeller when reduced, as described above, will eliminate the necessity of passing low pressure P2X air to cool the central bearing, allowing the elimination of the bearing seals.

Thus, the advantages of the present invention allows the elimination of complex bearing seals and, therefore, reducing the weight and cost. Furthermore, P25 air, which is used for cooling the front and rear bearings and the turbines, can be used instead of using more expensive cooled low pressure P2X air.

The use of more conventional materials for the impeller hub is maintained while significantly decreasing the degradation of the impeller through the use of cooler P3 air in the rear impeller cavity.

The bearing load can be adjusted by adjusting the swirling of the cooled P3 air in the impeller rear cavity, thereby providing good bearing load control.

On the other hand, since it is no longer necessary to try to maintain a lower T3 temperature for the air exiting from the compressor, a higher T3 temperature can be maintained, thereby increasing the engine performance. This is as a result of the cooling of the second P3 stream which is dedicated to the impeller rear cavity.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
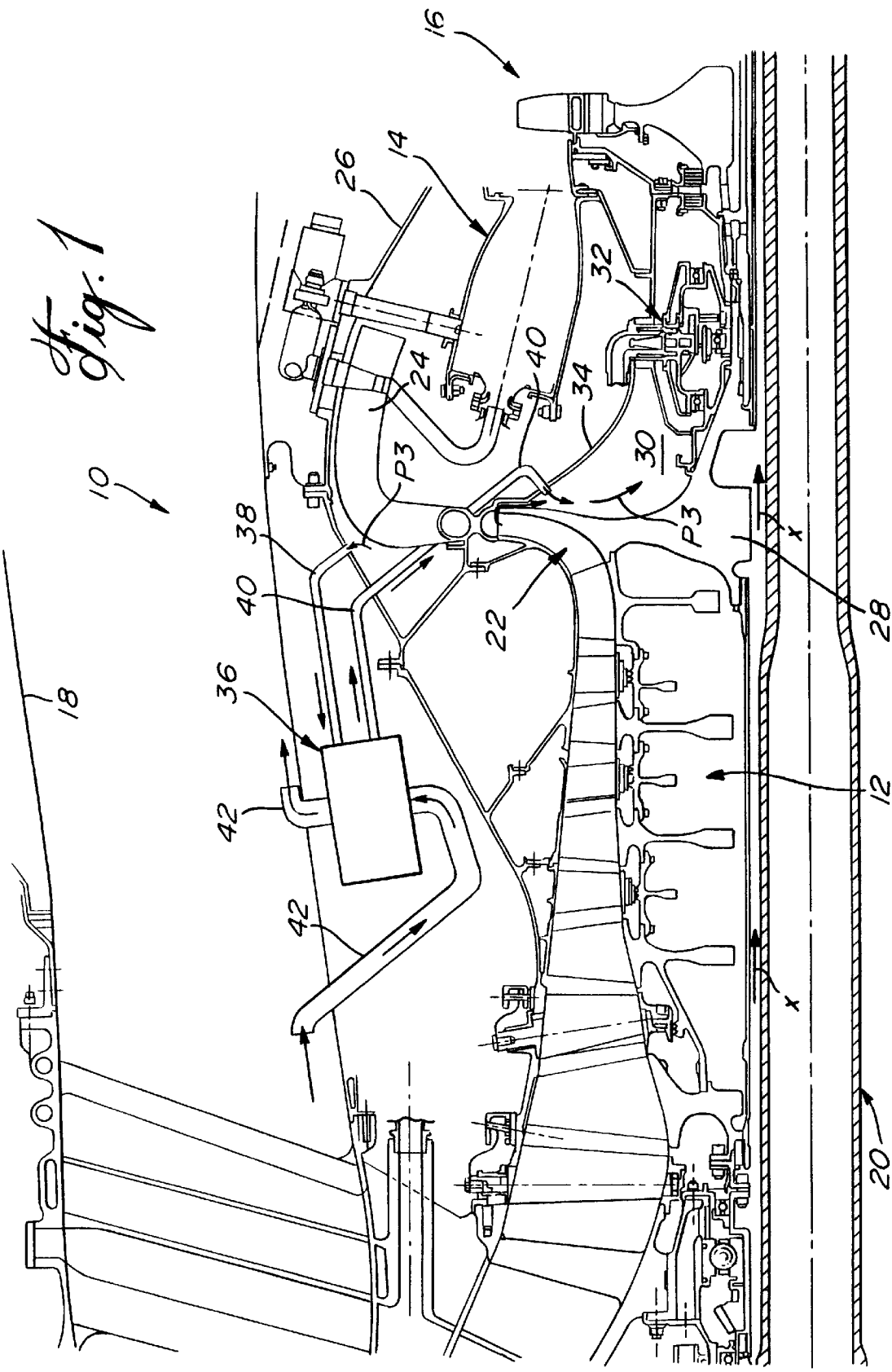
FIG. 1 is an enlarged fragmentary axial cross-section showing the compressor and combustion and turbine sections of a turbine engine with an embodiment of the present invention installed therein.

Referring now to the drawings, there is shown a portion of a gas turbine engine 10 which includes a compressor section 12, a combustion chamber 14 downstream of the compressor section, and a portion of the turbine section 16. The engine 10 is surrounded by a bypass duct 18. Concentric with the engine is a shaft 20 extending longitudinally thereof.

The compressor 12 includes a centrifugal impeller 22 which includes a hub 28. A pipe diffuser 24 surrounds the centrifugal impeller 22, and the pipe diffuser 24 extends downstream thereof within the casing 26. An impeller rear cavity 30 is formed behind the impeller hub, as shown in the drawings. A cavity wall 34 defines the cavity chamber 30. The combustion chamber 14 includes a combustor wall 52 and a nozzle 54.

Air exits at 46 from the tip of the centrifugal impeller 22. As described in U.S. patent application No. 08/771,906 filed Dec. 23, 1996, air is bled from the impeller tip into the impeller rear cavity 30 in order to provide air pressure against the rear wall of the impeller to adjust the thrust bearing load.

The present invention comprises bleeding a second stream of P3 air through conduit 38, as shown in FIG. 1, to a heat exchanger 36, and then returning this P3 air through conduit 40 into the cavity 30 to be mixed with the first stream of air which is bled from the impeller tip.

The heat exchanger 36 is cooled by bypass air which is passed through the conduit 42 passing through the heat exchanger and discharging back into the bypass at 42. By cooling the P3 air and passing it directly into the cavity 30, the typical temperatures in the impeller rear cavity 30 are reduced from 926° F. to approximately 640° F. This relatively cooler air in the cavity 30 eliminates or considerably reduces the degradation caused by the high temperature P3 air on the impeller 22, particularly the impeller hub 28.

Figure 2:
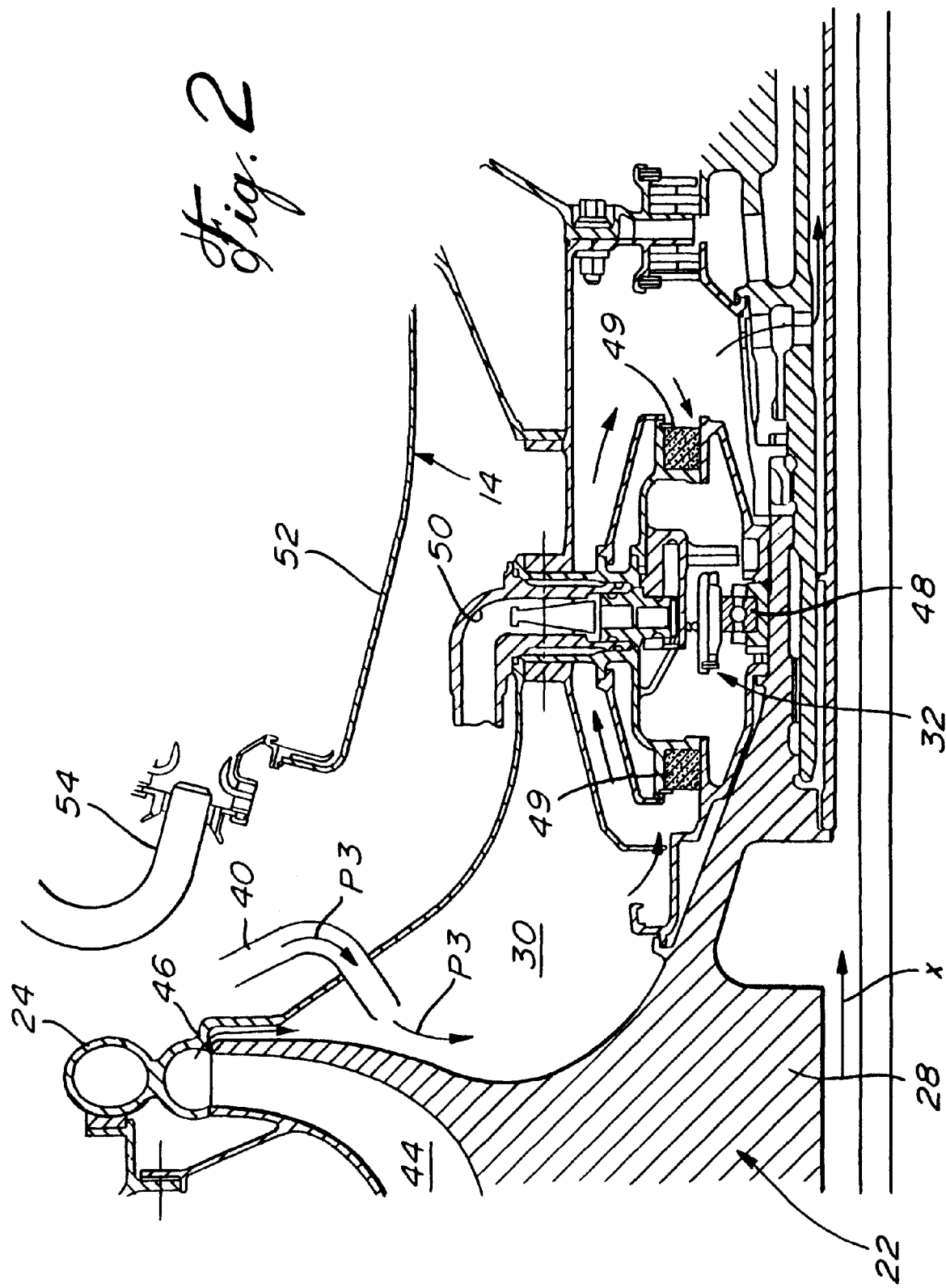
FIG. 2 is an enlarged fragmentary axial cross-section of a detail shown in FIG. 1.

In addition, the now cooler P3 air within the cavity 30 can be used to cool the bearing 32. The bearing 32, as shown in FIG. 2, includes roller bearing 48 and carbon seals 49. It is noted that the labyrinth seal as well as the brush seals have been removed to allow the higher pressure P3 air to enter the bearing assembly 32. The bearing 32 is provided with an oil pipe 50 for lubricating the bearing. Where P2X air, having been cooled, would normally pass through openings to cool the bearing 32, these openings, communicating with the area surrounding the shaft 20, have now been blocked off.

An advantage of this reconfiguration of the bearing and the distribution of cooling air eliminates the need of cooled P2X air, and thus normal P25 air which is used to cool the front and rear bearings is sufficient. The P25 air follows arrows identified X in the drawings.

Another advantage of this configuration is that the P3 air which is exiting from the pipe diffuser 24 may be maintained at a higher temperature so that pressure P3 can be higher for increased performance.

It is also noted that the cooled P3 air entering the cavity by means of conduit 40 counters the swirl of bleed air from the impeller tip to reduce the swirl and even out the pressure gradient against the impeller.

The flow from the impeller rear cavity after cooling the bearings 32 may be used to supplement the cooling of the turbine in the turbine section 16. Thus, the flow of P3 air will mix with the P25 air, concentric with the shaft 20, and be led to the low pressure turbine for cooling thereof.

I claim:

1. A turbine engine comprising a casing; a compressor section within the casing having a centrifugal impeller including an impeller tip and a diffuser surrounding the impeller tip, whereby P3 pressurized air exits from the diffuser; a turbine section; a shaft mounted for rotation about a central longitudinal axis connecting the impeller to the turbine section; a central bearing mounted to the casing downstream of the impeller and supporting the shaft; the impeller defining a rear cavity between the impeller and the turbine section and a cavity wall surrounding the rear cavity in the central bearing; means diverting a first stream of air from the impeller tip into the rear cavity; means for diverting a second stream of P3 air through a heat exchanger for cooling the second stream of P3 air; and means for passing the cooled P3 air from the heat exchanger to the rear cavity to mix with the first stream of air, whereby the temperature of the resulting mixed P3 air in the rear cavity is reduced at least to the point of improving the hub life of the impeller and eliminating the requirement of bearing seals for the central thrust bearing.

2. The turbine engine as defined in claim 1, wherein the central bearing is cooled by the flow of mixed P3 air from the impeller rear cavity.

* * * * *